Patented Aug. 31, 1948

2,448,180

UNITED STATES PATENT OFFICE 2,448,180

MEDICINAL COMPOSITION

Fred J. Helgren, Waukegan, Ill., assignor to Abbott Laboratories, a corporation of Illinois No Drawing. Application June 30, 1943, Serial No. 492,905

5 Claims. (Cl. 167—51.5)

The present invention relates to a new medicinal composition in which the ingredients cooperate to produce an improved "pack" or paste for post-extraction sockets and other body cavities exposed to infection.

The sulfonamide drugs including sulfanilamide and other "sulfa" drugs such as sulfathiazole (2-sulfanilylamino-thiazole), etc. have been used in dentistry as bacteriostatics in post-extraction sockets, and in medicine for local application to wounds. In dentistry, the sulfonamide drugs have heretofore been inserted into the sockets in the form of compressed tablets or fragments thereof, or in the form of the powder itself. Experience has demonstrated that these methods of application are far from satisfactory. For example, it was found when using the tablets or powder, that the active drug did not come in contact or remain in contact with the entire surface of the socket. The tablets or fragments were also found objectionable, due to their action as a "foreign body," causing irritation of the tender socket tissues, with resulting pain. Of utmost importance, the tablets or fragments proved unsatisfactory as they were found not to disintegrate rapidly enough to exert the desired therapeutic effect.

Many attempts were made by the art to overcome the above objections and provide a satisfactory pack. One suggestion called for the use of mixtures of sulfonamide drugs with oily or fatty materials. Tests with the resulting ointments, however, also demonstrated that they were unsatisfactory. It was found, for example, that the fatty materials deleteriously affected the desired adherent characteristics of the composition, and further, that the fatty materials had a tendency to soften at body temperature allowing the drug to run out of the cavity. Another and one of the principal objections to the use of ointments, was found to be in their limited medicinal value. This was demonstrated by tests showing the oily or fatty compositions to have practically no "zone of inhibition" when tested with pathogenic organisms.

The principal object of the present invention is to provide an improved pack free from the above disadvantages.

Another object of the present invention is to provide a stable, highly active sulfonamide paste with a wide zone of inhibition.

Other objects of the present invention will be apparent from the following detailed description.

After a detailed research investigation, including many tests in the dentistry field, I discovered that a satisfactory pack could be prepared by combining a sulfonamide drug with a humectant and a small amount of gum. The following examples will serve to illustrate the present invention:

*Example 1*

| | Per cent |
|---|---|
| Sulfathiazole powder | 55–68 |
| Glycerin | 25–35 |
| Gum acacia | 5–7 |

*Example 2*

| | Per cent |
|---|---|
| Sulfathiazole powder | 62 |
| Sorbitol liquid | 32 |
| Gum acacia | 6 |

*Example 3*

| | Per cent |
|---|---|
| Sulfathiazole powder | 60 |
| Propylene glycol | 33 |
| Tragacanth or Karaya gum | 7 |

While the sulfathiazole employed in the above examples is preferred, it may be replaced by other "sulfa" or sulfonamide drugs including sulfanilamide, sulfadiazine, etc. Experience in this connection has demonstrated that the particle size of the drug is of utmost importance in the present invention. For example, a paste made with particles from 5 to 20 microns in size is definitely inferior to a product made up of particles from 1 to 5 microns in size. In the preferred compositions the drug particles should be below 10 microns in size and about 90 per cent of such particles should fall within 1 to 5 microns. The drug particles may be ground to the desired size in accordance with standard practices.

The humectant employed in the composition of the present invention may be any hygroscopic heavy solvent of the polyhydroxy type, e. g., glycerine, the glycols, etc. Solid humectants such as sorbitol, dissolved in water to form a heavy syrup may also be employed. These materials which are substantially non-toxic, dissolve part of the drug and furnish a constant supply of the drug in the desired solution form. The gum employed in the composition of the present invention may be of the vegetable gum type used in the above examples, or any non-toxic inert filler such as starch, dextrin, gelatin, etc. The term "gum" used herein is intended to cover such materials, all of which form sticky or adherent pasty masses with water.

The ingredients of the present invention are so proportioned that the final paste (which is made by mixing the ingredients into a homogeneous mass) has a putty-like consistency. In this form it is firm, pliable, non-drying and stable, and the surface always uniform and soft, causing no irritation to the tissues. The dentist or physician can readily adjust the quantity to be inserted to the size and shape of the cavity, filling it completely and packing it to obtain close contact with the entire inner tissue surface. This assures maximum bacteriostatic effect.

Many tests have shown that the use of a humectant is essential in the compositions of the present invention, and that products made without an organic solvating-hygroscopic material of the type specified, are unsatisfactory. Aqueous suspensions of the drug in gums, for example, have been tried but found wanting. Investigations indicate that the ingredients of the composition cooperate as follows. The polyhydroxy humectant, in addition to keeping the paste uniform, pliable, soft, etc., also dissolves a portion of the (water-insoluble) sulfonamide and furnishes a constant supply of drug in the desired solution form. This provides for more rapid and effective action than obtainable by using powder, tablets or the like. The gum which is used in the preferred compositions, absorbs water including water from the tissues, and aids the mass in adhering to the walls of the cavity. This action liberates the drug dissolved in the organic polyhydroxy solvent, which, in turn, has been found particularly effective on the partially dehydrated tissues resulting from the absorption of water by the gum. Tests have also demonstrated that the compositions of the present invention have a wide zone of inhibition and have an unusually high medicinal value.

Any local anesthetic compatible with the drug may be employed with the compositions of the present invention. The use of about 3 per cent benzyl alcohol is generally preferred as it acts as a preservative for the paste, exercises bacteriostatic action and is non-toxic and non-irritating, in addition to the local anesthetic effect. In addition, any antiseptic which is compatible with the sulfonamide drug and non-injurious to the tissues, may also be employed. The use of about 0.02 per cent of the mercury compound of 4-nitro-ortho-cresol is generally preferred due to its antiseptic activity in high dilution, its efficiency in the presence of blood serum and its low toxicity and freedom from irritating effect on the tissues. An antiseptic of this type is usually employd as the "sulfa" drugs are selective in their bacteriostatic action. It will also be obvious to those skilled in the art that a mixture of two or more of each class of ingredients may be employed, that other appropriate medicaments and flavors may be added as desired and that the proportion of ingredients may be varied. The drug, for example, may be used from around about 5 to 80 per cent, the proportions of humectant being varied to provide for the desired consistency. With small amounts of the drug it is generally preferred to include some inert filler such as talc, kaolin, bentonite, etc. Ordinarily, the use of about 60 per cent drug and 30 per cent humectant is preferred.

Others may readily adapt the invention for use under various conditions of service by employing one or more of the novel features disclosed, or equivalents thereof. As at present advised, with respect to the apparent scope of my invention, I desire to claim the following subject matter.

I claim:

1. A medicinal composition of putty-like consistency adapted to be inserted into post-extraction dental sockets consisting essentially of about 55-68 per cent of fine sulfathiazole powder, about 25 to 35 per cent glycerin and about 5 to 7 per cent gum acacia.

2. A medicinal pack for preventing infection in body cavities, consisting essentially of about 60 per cent sulfathiazole in powder form of about 1 to 5 microns in size, about 30 per cent of a hygroscopic polyhydroxy solvent composition and a substantially unhydrated inert gum having a strong affinity for water, in sufficient quantities to provide said pack with a putty-like consistency.

3. A medicinal composition of putty-like consistency adapted to be inserted into post-extraction cavities in the gums, comprising: a vehicle comprising an inert gum adapted to form an adherent pasty mass with water and having a strong affinity for water, and the remainder a liquid humectant of the polyhydroxy type; said vehicle ingredients being present in the ratio of one part of gum to from about three and one-half parts of humectant to about seven parts of humectant, said vehicle being impregnated with a solid medicinal agent.

4. A medicinal composition of putty-like consistency adapted to be inserted into post-extraction cavities in the gums, comprising: a vehicle comprising an inert gum adapted to form an adherent pasty mass with water and having a strong affinity for water, and the remainder a liquid humectant of the polyhydroxy type; said vehicle ingredients being present in the ratio of one part of gum to from about three and one-half parts of humectant to about seven parts of humectant, said vehicle being impregnated with a medicinal agent.

5. A medicinal pack for combating infection in body cavities, consisting essentially of about 60% of finely powdered sulfa drug, about 30% of a hygroscopic polyhydroxy solvent composition, and a substantially unhydrated inert gum having a strong affinity for water, in sufficient quantities to provide said pack with a putty-like consistency.

FRED J. HELGREN.

REFERENCES CITED

The following references are of record in the file of this patent:

UNITED STATES PATENTS

| Number | Name | Date |
|---|---|---|
| 246,697 | Wadleigh | Sept. 6, 1881 |
| 1,053,720 | Feigensohn | Feb. 18, 1913 |
| 1,661,588 | Von Neergaard | Mar. 6, 1928 |
| 2,089,845 | Atkins | Aug. 10, 1937 |
| 2,321,694 | Miller | June 15, 1943 |

OTHER REFERENCES

Journal of the American Pharmaceutical Association, Practical Pharmacy edition, Aug. 1942, pp. 291, 292.

Merck Report, July 1940, page 13.

British Medical Journal, Nov. 15, 1941, p. 685.

Quarterly Journal of Pharmacy and Pharmacology, April–June, 1942, p. 136.

American Professional Pharmacist, June 1942, p. 355.

Journal of the American Medical Association, Apr. 25, 1942, p. 1514.

"New Modern Drugs," 9th supplement, Jan. 1943, page 26.

British Medical Journal, March 1941, pp. 469 to 472.

U. S. Dispensatory, 22nd edition (1937), page 515.

The National Formulary, 4th edition (1916), page 96.

The National Formulary, 7th edition (1942), page 205.